Figure 1:
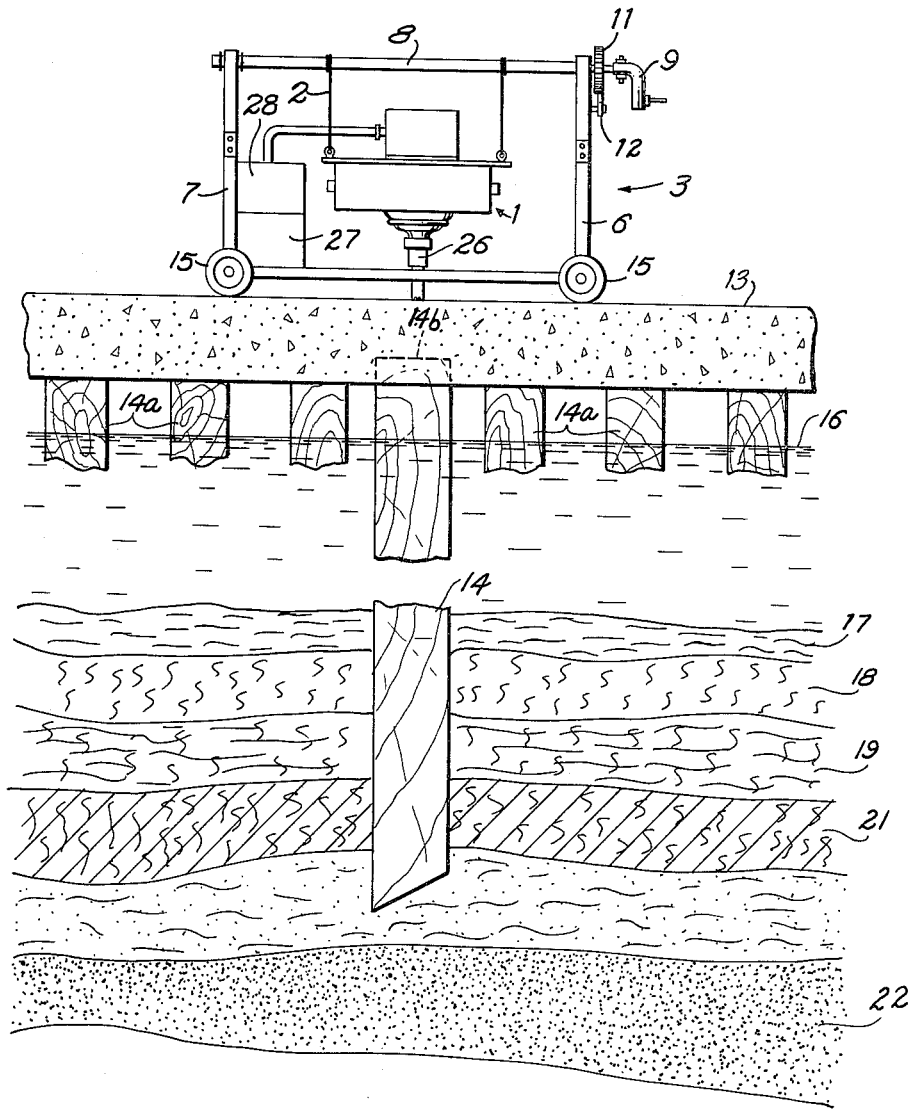

Sept. 28, 1965 P. F. MINASIAN 3,209,177
APPARATUS FOR MEASUREMENT OF PILING AND THE LIKE IN PLACE
Filed Oct. 30, 1962 2 Sheets-Sheet 1

INVENTOR.
PAUL F. MINASIAN
BY
ATTORNEYS

INVENTOR.
PAUL F. MINASIAN
BY
ATTORNEYS

United States Patent Office 3,209,177
Patented Sept. 28, 1965

3,209,177
APPARATUS FOR MEASUREMENT OF PILING AND THE LIKE IN PLACE
Paul F. Minasian, 115 Plov Way, Vallejo, Calif.
Filed Oct. 30, 1962, Ser. No. 234,261
4 Claims. (Cl. 310—8.3)
(Granted under Title 35, U.S. Code (1952), sec. 266)

The invention described herein may be manufactured and used by or for the Government of the United States of America for governmental purposes without the payment of any royalties thereon or therefor.

The invention relates to the measurement of bulwarks and sheet or other type supports and pilings in place.

In a number of instances, it has been found that the pertinent records or data relative to installations, such as pilings and other structural supports of wharves, piers, bridges, etc., have been lost or destroyed with the obvious result that the length, depth, etc. of these supports no longer is known. Such data, of course, may be of vital importance particularly when new construction is desired or when the area in question is to be dredged to accommodate heavy shipping. For example, it is important to know the depths of piling tips before any such dredging is started. It also is important to determine in advance appropriate lengths for new pilings or supports. As is known, such supports may be steel sheet or reinforced concrete pilings. Usually, they are so installed as to be predominantly underwater and embedded in the water basin floor with approximately only 10% of their length exposed above the surface of the water.

The job of providing the unknown data or information has been a notoriously expensive, slow, tedious and somewhat hazardous task. Also, on occasion, it has proven most impractical to perform particularly, for example, when full-scale shipbuilding operations are in process in the area in question. Divers customarily have been employed for this purpose and it is their function to physically dig or bore in the basin floor to the pile tips so as to permit the making of appropriate measurements. Obviously such manual operations are expensive and slow and, from the viewpoint of accessibility and safety of the diver, it frequently is impractical to clear the area for his work.

It is therefore an object of the present invention to provide a relatively fast, inexpensive, easily accomplished and safe method for determining the lengths of piles and other subsurface support structure.

A further object is to provide apparatus capable of so performing the pile length determinations and, more particularly, to provide a simple, portable, lightweight and low cost apparatus capable of being used by relatively unskilled operators.

Another object is to permit the determination of pile lengths for measurements taken at or above the surface of the water in which the piles are sunk.

Still a further object is to provide method and apparatus suitable not only for determining pile lengths but also for locating the piles from the surface of the water so as to permit the length then to be determined.

Another object is to provide apparatus capable of use in a crowded berthing area and also capable of locating and determining the pile tip depth of various types of piling including the type in which the top of the piling is hidden under several feet of exposed, continuous, reinforced concrete capping.

Other objects and their attendant advantages will become more apparent in the detailed description which is to follow.

In brief, the present invention utilizes a transducer, which preferably is an ammonium dihydrogen phosphate crystal array of a particular construction to be described to propagate sound into a steel shaft carried by the transducer and capable of being contacted with the exposed portion of the piling or with the concrete cap which sometimes covers the piling itself. The operation and structural features of this equipment, will be considered subsequently, it sufficing for the present to be noted that it has proven exceedingly accurate, coinciding almost precisely with manually obtained measurements which subsequently have become available during actual new construction work or dredging operations.

Figure 2:
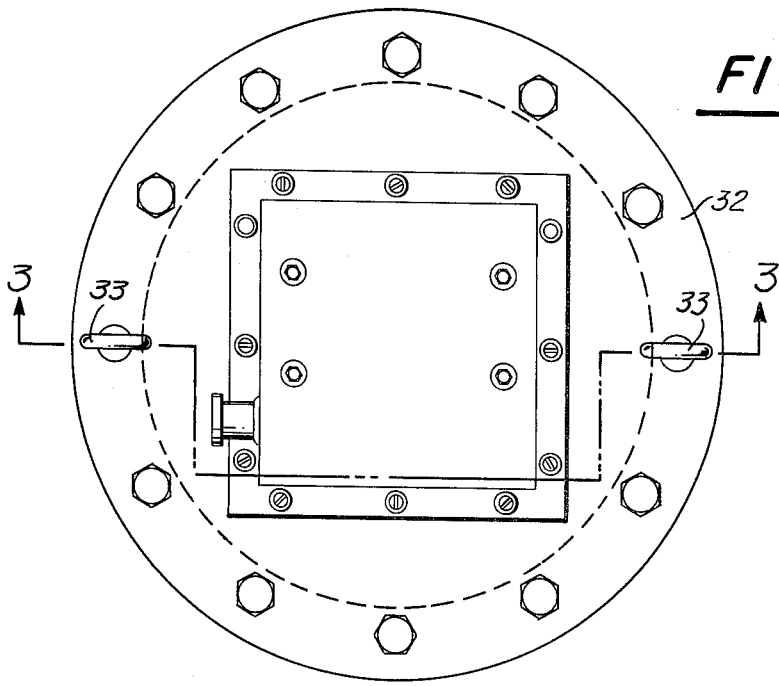
Figure 3:
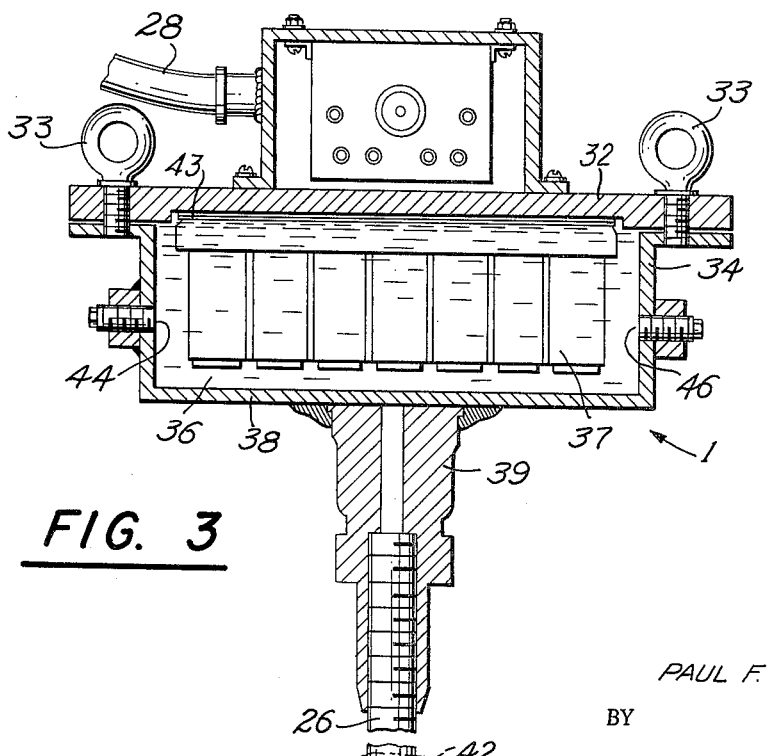

The preferred embodiment of the invention is illustrated in the accompanying drawings of which:

FIG. 1 is a side elevation of the apparatus supported on a reinforced concrete pile capping over a body of water, this figure also rather schematically illustrating conventional stratas on layers of the basin floor, FIG. 2 is a plan view of a transducer shown in FIG. 1, and FIG. 3 is a sectional view taken along lines 3—3 of FIG. 2.

Referring to the drawings, the apparatus for performing the present method is illustrated principally in FIG. 1 where it is seen to include a transducer 1 suspendably carried by cables 2 on a movable carriage or dolly 3, the dolly being of a four-wheeled type having a rectangular, open-frame bottom and vertical stanchions 6 and 7 projecting upwardly from the center of the side members of the rectangular bottom. As would be expected, stanchions 6 and 7 are braced in appropriate manner to provide rigidity. Also, transducer 1 is adjustably carried on the dolly by rotatably mounting a cross rod support member 8 in suitable journals provided at the top portion of each stanchion. To rotate the cross rod a crank 9 is mounted on the end portion nearest stanchion 6, this end portion also mounting a ratchet wheel 11 engagable by a dog 12 carried by this stanchion. Obviously, the crank may be rotated clockwise or counterclockwise to raise or lower the transducer and the adjusted position maintained by the ratchet and dog mechanism. The wheels of the dolly, indicated by numeral 15, permit a freedom of movement which, as will be described, is utilized principally for the purpose of initially locating the pile to be measured.

As also shown in FIG. 1, the dolly is supported on a reinforced concrete capping 13 of the type frequently used over a series of parallel pilings, such as pilings 14 and 14a shown in this figure. The full length of piling 14 is illustrated in the drawings and it will be seen that the piling extends downwardly through water 16 of the water basin into what may be considered a silt layer 17, a firm brown clay layer 18, a silty clay layer 19 and a stiff, white-gray clay layer 21 in which the pile tip is embedded. Beneath layer 21 may be found another layer of extremely dense silty sand which customarily overlies an even denser sandstone 22.

The principal purpose of the present invention is to determined the precise length of pile 14 or the depth of the pile tip. In other applications, it might be desirable simply to determine the depth of the pile tip so as to locate the relatively hard strata of the water basin floor. Although it is customary to maintain records of pile lengths, it has been found in practice these records frequently are lost or destroyed so that reference is not available. As already indicated prior operations required the use of a diver to manually dig to the pile tip.

The present invention eliminates the need for divers by permitting the measurements to be obtained remotely at a position above the surface of the water. In further explanation, pilings may be of various well-known types including sheet piling installations where the top of the bulwark or pilings are hidden under several feet of continuous, reinforced concrete capping such as capping 13 of FIG. 1. In any event, it is customary for the pilings to project upwardly out of the water so as to have exposed portions 14b which may or may not be hidden beneath the concrete capping. The present invention permits pile length determinations of such reinforced pilings or other bulwarks or support structures in either situation: that is, whether or not the piling or support is capped.

The principal feature of the present invention resides in the use of transducer 1 to couple pulsed electrical energy into a short steel shaft 26, which, as shown in FIG. 1, projects downwardly from the transducer to permit it to be brought into direct contact with concrete capping 13 or into direct contact with exposed portion 14b of the piling if such a situation exists. The pulsed energy coupled by shaft 26 into the capping travels downwardly through the capping into piling 14, also, the energy of each pulse is reflected in known manner back through the piling and the cap. In particular, the soil in which the piling is sunk varies considerably in density and therefore velocity characteristics. A pronounced echo is obtained when the propagated pulse reaches the pile tip and this reflected echo also is clearly distinguishable from any other reflected echoes that might be obtained. Obviously, if the pile material is known, its length can be determined by calculating the velocity of sound in that material.

Considering the invention in greater detail, the apparatus includes conventional sound energy transmitters and receivers which, as illustrated, may be in the form of a pulse generator, generally indicated by numeral 27, and a receiver indicator 28. The generator preferably is of a type having a free running crystal oscillator for providing a relatively low frequency of about 12,000 cycles per second although the exact frequency of the sound energy is not especially critical. Also, generator 27 should include a keyer or gate to provide a pulse repetition rate of about 60 pulses per second and, most suitably, a short pulse of about 2 to 4 milliseconds is employed. The entire equipment may be operable from any 110–120 volt, 60-cycle, single phase, A.C. source, and the pulsed energy so generated is coupled to the transducer through the flexible cable 28.

Receiver-indicator 28 may utilize an entirely conventional receiver and it is preferable for practical purposes to couple the receiver to a cathode ray oscilloscope for recording reflected sound energy. As illustrated, the oscilloscope is intended to be a part of the receiver-indicator although it, as well as the receiver and, if desired the generator could be remotely disposed. In an entirely conventional manner, the oscilloscope can be adapted to indicate the lapsed time between the propagation of a single pulse and its returned reflected echo, and the time lapse can be calibrated according to an appropriate scale to indicate pile length; a unit determination such as the foot length customarily being employed. In some operations, it may be necessary to vary the oscilloscope scale. For example, it may sometimes be desirable to determine the location of structural voids, this situation existing when earth fillings behind sheet pilings sink or wash out to the off shore side of the pilings so as to leave voids. Obviously, if the objective is to determine voids, the scale of the oscilloscope should be altered to indicate sound velocity in the void or, in other words, in air. If desired photographic equipment can be utilized to provide a more permanent record for subsequent study or analysis. However, the means for photographing and for analyzing sound reflections are considered accessories or refinements which may be adopted and used according to the discretion of the operator.

Transducer 1, by itself, provides another feature of the present invention. Thus, as shown in FIGS. 2 and 3, the transducer is formed of a circular, disk-shaped casing having a top cover 32 provided with threaded openings for receiving I-bolts 33 through which transducer-supporting cables 2 are looped to suspendably support the transducer in the manner previously described. Bolted to cover plate 32 is a disk-shaped transducer body portion 34 which, in conjunction with the cover plate, provides a suitable chamber 36 for receiving the energy-transducing or converting means which, as shown, in a crystal array 37, preferably formed of ammonium di-hydrogen phosphate crystals. In the conventional use of such arrays, the crystals normally are bound by a rubber diaphragm in the plane of the sound propagation so as to couple effectively the transmitted energy to the sea. However, in the present transducer, the entire transducer casing is formed of a corrosion resistant (CRES) steel. Thus, the casing of the present invention has, in lieu of a rubber diaphragm, a CRES steel diaphragm 38 which, as seen forms the bottom wall of the casing so as to be disposed in the plane of propagation for obvious coupling purposes.

Further, centrally secured, by welding or other similar means, to the center of steel diaphragm 38 is a reducing fitting 39 which has an internally threaded bore to receive the threaded end of previously mentioned steel shaft 26, this shaft also being formed of corrosion resistant steel. Another important factor which greatly improves energy coupling is that the bottom end of steel shaft 26 is provided with serrations 41 and the serrations are coated with an acoustically conductive fluid 42 such as technical grade castor oil, for the purpose of materially improving energy coupling into reinforced concrete capping.

To further improve energy coupling, mentioned chamber 36 of the transducer casing is filled with an acoustically conductive fluid 43 such as technical grade castor oil and, to facilitate the filling, the casing is formed with tapped plugged holes 44 and 46 disposed preferably in diametrically opposite positions. In preparing the transducer for operation, chamber 36 is reduced in pressure by vacuum pumping and, subsequently, technical grade castor oil is admitted through the tapped holes, following which the holes, of course, are tightly plugged.

In operation, a pulse of energy from generator 27 is applied to crystal array 37 at the frequency, pulse length and pulse rate previously mentioned. At this point, it might be noted that an array of ammonium di-hydrogen phosphate crystals is capable of being driven at a thousand watts of energy, while sunken pile lengths do not often exceed 100 feet. This fact imposed a need for selecting optimum energy pulse length and pulse repetition rate. Thus, a short pulse (2–4 milliseconds) at a pulse repetition rate of about 60 pulses per second is used. Also, the low frequency of 12,000 cycles per second provides the advantage of low transmission losses and, of course, the propagation should be as directional as possible.

Further considering the operation of the apparatus, when the pulse of energy is applied to the transducer, a portion of this energy also may be simultaneously applied to trigger the linear sweep of the cathode ray oscilloscope. The pulse energy applied directly to the transducer sends sound vibrations through the technical grade castor oil and on through steel diaphragm or window 38 of the transducer casing, the sound pulse then traveling through reducing fitting 39, which also preferably is formed of corrosion resistant steel, and into steel shaft 26 through which it is transmitted directly into concrete cap 13 and on into piling 14.

In some instances, such as the one illustrated in FIG. 1, the location of the particular piling is hidden from the operator by the capping so that the first step is to assure that shaft 26 is directly over the piling. This step of locating the piling may be accomplished by moving the dolly over the concrete capping and simultaneously generating pulses and observing reflected echoes. The operator readily becomes capable of ascertaining when he has located the transducer directly over a piling as opposed to locating a shaft over void areas. Also, it is important to note that the castor oil used on serrations 41 of the shaft facilitates this piling-locating operation since the oil leaves a trace on the capping and this trace indicates to the operator areas already sampled as well as establshes a reference point from which linear measurements are made to locate of adjacent piles.

As has been explained pile lengths determinations are obtained by velocity variations of sound in the piling. Each reflected pulse obviously will induce a voltage in the crystal array which voltage or energy then is amplified and applied to the oscilloscope at a precise point in the sweep which accords with the time lapse since the pulse first was applied simultaneously to the transducer and the oscilloscope. The reflected echo from the pile tip is easily distinguishable from any other echoes that may be received. Obviously, a scale of the sound energy velocity in conventional pile material may be easily calculated since the density and Young's modulus of the material in question determine velocity value. In cases of contiguous concrete cap and steel pile, a simple velocity or length ratio between the cap and steel pile, or combination concrete cap and reinforced concrete pile, may be derived. However, since the concrete cap represents a very small portion of the overall length of the cap and steel pile in combination, it is only when extreme accuracy is desired that it becomes necessary to calculate this velocity difference. In cases of concrete capping over steel reinforced concrete piles, it has been noted that no appreciable velocity differences are discernible.

It is apparent that the principle and practice of the invention are clear on the foregoing description. Obviously, pile lengths determinations made according to the present method and with the particular apparatus previously described, completely eliminates the need for divers, as well as the expensive, slow and frequently dangerous and impractical tasks which such divers must otherwise perform. The present apparatus not only is small, lightweight, and relatively inexpensive but, of considerable importance, it has proven entirely accurate in determinations which have been made. Thus, as already noted, all determinations made with the present apparatus and according to the present method have subsequently checked almost precisely with both physical measurements of the pilings as well as with such records as have been discovered.

Obviously many modifications and variations of the present invention are possible in the light of the above teachings. It is therefore to be understood that within the scope of the appended claims the invention may be practiced otherwise than as specifically described.

What is claimed is:

1. Apparatus for measuring in situ the length of a sunken piling structure having integral exposed portions, the apparatus comprising;
   (a) a source of electrical pulsed energy,
   (b) a transducer coupled to said source for converting said electrical pulses into sound pulses,
   (c) and a metal shaft acoustically coupled to and dependently carried by said transducer for conducting the major portion of said sound pulses,
   (d) the free-end portion of said shaft being serrated,
   (e) and a coating of an acoustically conductive fluid on said serrations for marking and for improving energy coupling into surfaces contacted by said shaft end.

2. The apparatus of claim 1 wherein said transducer includes;
   (a) a metal casing,
   (b) a crystal array in said casing,
   (c) an energy coupling fluid filling the voids within the casing,
   (d) and a reducing fitting flushly affixed to said casing,
   (e) said metal shaft being secured to said fitting.

3. Apparatus for measuring in situ the length of a sunken piling structure having integral exposed portions, the apparatus comprising;
   (a) a source of electrical pulsed energy,
   (b) a transducer coupled to said source for converting said electrical pulses into sound pulses,
   (c) and a metal shaft acoustically coupled to and dependently carried by said transducer for conducting the major portion of said sound pulses,
   (d) a metal casing,
   (e) a crystal array in said casing,
   (f) an energy coupling fluid filling the voids within the casing,
   (g) and a reducing fitting flushly affixed to said casing,
   (h) said metal shaft being secured to said said fitting.

4. The apparatus of claim 3 further including;
   (a) a carrier means,
   (b) and vertically adjustable suspension means carried by the carriage and supporting said transducer.

References Cited by the Examiner

UNITED STATES PATENTS

| 2,280,226 | 4/42 | Firestone | 73—67.8 |
| 2,545,101 | 3/51 | Meunier | 310—8.1 |
| 2,656,714 | 10/53 | Cartier | 73—67.8 |
| 2,709,760 | 5/55 | Van Valkenburg | 310—8.1 |

ORIS L. RADER, *Primary Examiner.*

JOHN P. BEAUCHAMP, MILTON O. HIRSHFIELD,
*Examiners.*